United States Patent [19]

Bhateja et al.

[11] 4,077,683
[45] Mar. 7, 1978

[54] ROLLER THRUST BEARING CAGE AND ROLLER ASSEMBLY

[75] Inventors: Chander Prakash Bhateja, Harwinton; Richard Lassen Alling, Torrington, both of Conn.

[73] Assignee: The Torrington Company, Torrington, Conn.

[21] Appl. No.: 669,400

[22] Filed: Mar. 22, 1976

[51] Int. Cl.² ............................................. F16C 33/46
[52] U.S. Cl. ................................. 308/235; 308/217
[58] Field of Search .................. 308/202, 207 R, 215, 308/217, 218, 219, 235

[56] References Cited

U.S. PATENT DOCUMENTS

| 466,444 | 1/1892 | Simonds | 308/235 |
| 1,494,392 | 5/1924 | Van Loozen | 308/235 |
| 2,454,028 | 11/1948 | Baker et al. | 308/235 |
| 3,963,285 | 6/1976 | Kellstrom | 308/217 |
| 3,966,284 | 6/1976 | Martin | 308/235 |

*Primary Examiner*—Richard A. Bertsch
*Attorney, Agent, or Firm*—Frank S. Troidl

[57] ABSTRACT

The roller thrust bearing cage and roller assembly includes an annular cage with a plurality of circumferentially spaced pockets. Each of the pockets is shaped to give proper guidance to the roller when the extended center line of the roller passes through the axis of the annular cage. Preferably each pocket has two radially, inwardly converging sides and preferably, the pockets are trapezoidal. A cylindrical roller is preferably located in each of the pockets.

3 Claims, 4 Drawing Figures

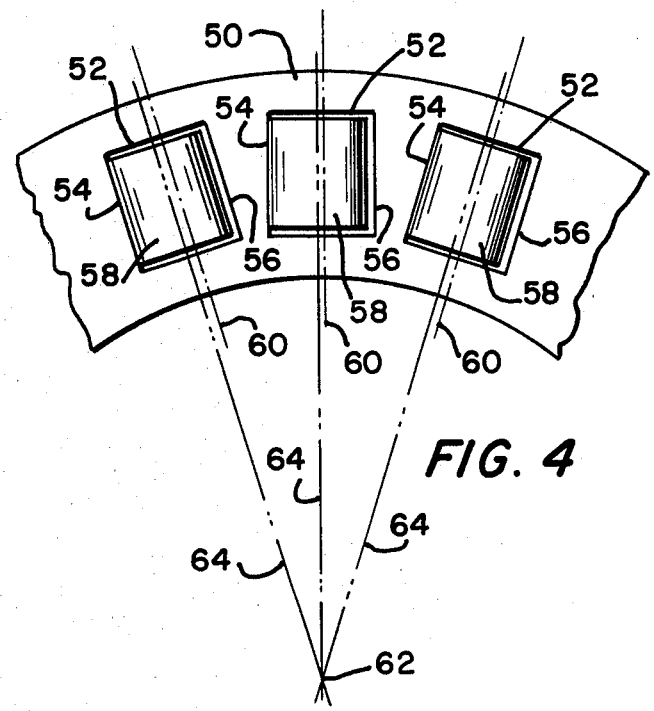

ROLLER THRUST BEARING CAGE AND ROLLER ASSEMBLY

This invention relates to roller thrust bearings. More particularly, this invention is a new and novel cage and roller assembly.

The conventional thrust bearing cage and cylindrical roller assembly includes an annular cage (either one piece or two piece) with a plurality of circumferentially spaced roller pockets. In the conventional cage and roller assembly, the pockets are rectangular or substantially rectangular in shape with their center lines passing through the axis of the cage. Cylindrical rollers or needle rollers are located in each of the rectangular pockets. The rollers turn the cage and are guided by it.

However, because the cage pocket is formed large enough to have running clearance between the roller and the pocket walls, and because manufacturing inaccuracies require the use of even larger pocket dimensions, when the roller is in full-length guiding contact with one lateral wall of the pocket, the extended center line of the roller does not pass through the axis of the thrust bearing cage but to one side of the axis, and the roller is not truly radially aligned in the thrust bearing.

The cylindrical roller in a thrust bearing can have true rolling at only one point along its length, while all the other points are in sliding frictional contact with the races. We have found that these friction forces generally result in balanced coupling moments which tend to cause the extended center line of the roller to pass through the axis of the cage during rotation of the bearing. Thus, the periphery of a radially-aligned roller which moves into contact with a lateral wall of the roller pocket of the conventional cage contacts the wall at a slight angle, and the edge of the radially outer end of the roller rubs the lateral wall near the radially outer end of the pocket. This contact with the cage produces unbalanced coupling forces which swivel the roller toward alignment with the pocket center line but then generally cause over-correction so that the opposite lateral edge of the same end of the roller rubs against the other lateral wall of the pocket near its radially outer end. This swiveling of the roller out of radial alignment is called "skewing". When the roller skews past center, past radial alignment, the coupling moments are reversed, and the roller swivels back again. This swiveling of the roller back and forth as it seeks stable orientation on the radial line is called "hunting". After the initial skewing, the two ends of the roller may contact opposite walls as skewing continues. When the roller rubs against the walls only at its ends, instead of having full-length contact, there results excessive abrasion of cage and roller, with concomitant production of abrasive debris to the detriment of the bearing. The roller skewing itself also directly causes excessive water on rollers and races, again to the detriment of the bearing. The hunting and skewing of the rollers also causes undesirable vibration and noise in the bearing as the rollers contact the other bearing components.

We have found by extensive tests and experimentation that the undesirable wear of the pockets and rollers can be substantially reduced by providing a cage which provides proper guidance of the rollers when the extended center lines of the rollers pass through the axis of the bearing cage. Preferably, each wall of each pocket is so located that there is always full-length contact with the periphery of a radially-oriented cylindrical roller lying against either wall. Thus, each pocket would preferably be trapezoidal and symmetrical about its center line, with radially inwardly converging walls. With such a pocket shape, the race can be rotated with respect to the cage either clockwise or counterclockwise and still have the radially oriented roller in full-length guiding contact against one wall or the other of the pocket. The particular wall which the cylindrical roller contacts depends on the direction of relative rotation of the race or races.

It is not essential that the pocket be trapezoidal if we do not wish the bearing to be able to rotate in either or both directions with our good full-length roller contact. If we choose to rotate the bearing only in one direction, only one side of the pocket need be properly located to guide the roller while the roller is radially aligned in the bearing. Thus, we might still use a rectangular pocket, but one which is offset slightly from the radial line so that only one wall will properly guide the roller. The shape and location of the second wall becomes relatively unimportant because it generally will be out of roller contact. However, at installation that bearing must be selectively oriented to assure proper contact between the roller and the proper wall of the pocket.

The invention as well as its many advantages may be further understood by reference to the following detailed description and drawings in which:

FIG. 4 is a schematic representation of a second preferred embodiment of our new cage and roller assembly.

In the various figures, like parts are referred to by like numbers.

Figure 1:
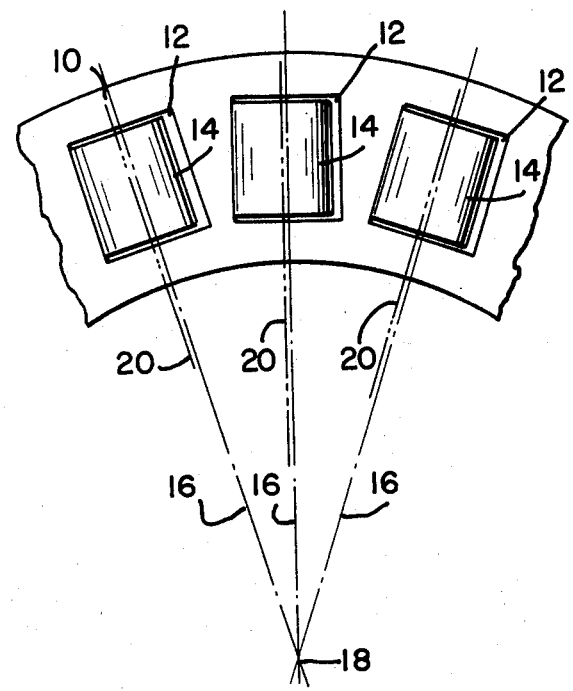
FIG. 1 is a schematic representation of a conventional cage and roller assembly.

As shown schematically in FIG. 1, the conventional cage and roller assembly includes an annular member 10 provided with circumferentially spaced pockets 12 of generally rectangular shape. A cylindrical roller 14 is located in each of the pockets 12. Pockets 12 are formed large enough to have running clearance between the roller 14 and the pocket walls.

We have found through our studies of the motions of the cylindrical roller and the rectangular pockets of a cage that as the bearing begins to rotate, the rollers 14 tend to skew; that is acquire a position where the extended center line of the roller does not pass through the axis of the cage 10, resulting in contact only at the roller corners and the pocket walls. The corner of the roller will therefore drive the cage, thus experiencing a drag itself. This drag, together with a correcting coupling resulting from the inherent slip between the roller and the two races (not shown) of the thrust bearing, tend to bring the roller center line back to the ideal position. This results in the loss of contact between the roller and the cage pocket walls. In fact, it often happens that before the bearing operation can stabilize so that the roller center line is ideally maintained, the roller may even overshoot its main position under the action of this overall correcting influence. This means that the roller tries to contact the pocket on the other side. This cycle will then be repeated resulting in a "hunting" type motion of the roller 14. Needless to say, such roller motion is extremely undesirable in a thrust bearing.

The same type of hunting or skewing motion of the rollers 14 which occurs when the bearing first starts to rotate, also occurs during the continuation of the rotation.

Figure 2:
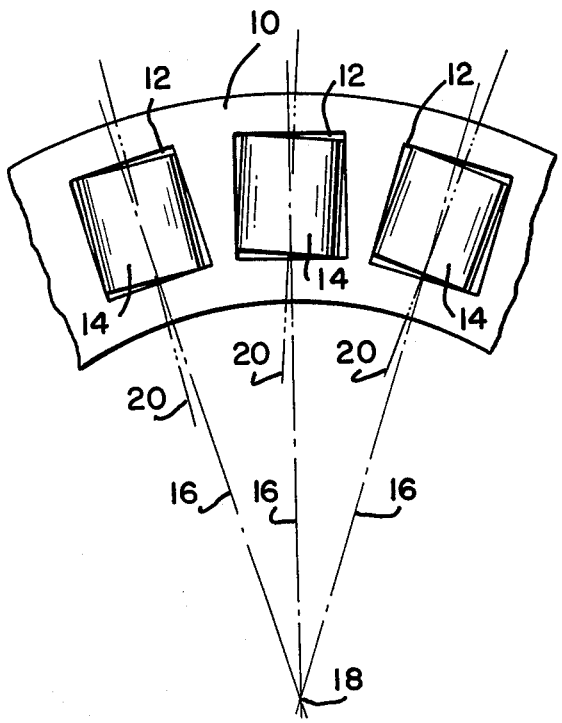
FIG. 2 is a schematic representation similar to FIG. 1 illustrating the hunting of the rollers.

As shown in FIG. 1, the extended center lines 16 of the pockets 12 pass through the axis 18 of the annular cage 10. As the races (not shown) begin to rotate, the rollers 14 start skewing to a position such that the extended center lines 20 of the rollers try to pass through the axis 18. This causes the "hunting" action (see FIG. 2) before a full line contact of the rollers 14 with the side walls 22 (see FIG. 1) of pockets 12 occurs. Note that when there is full-line roller side wall contact, the extended center lines 20 of the rollers 14 do not pass through the axis 18 of annular cage 10.

Figure 3:
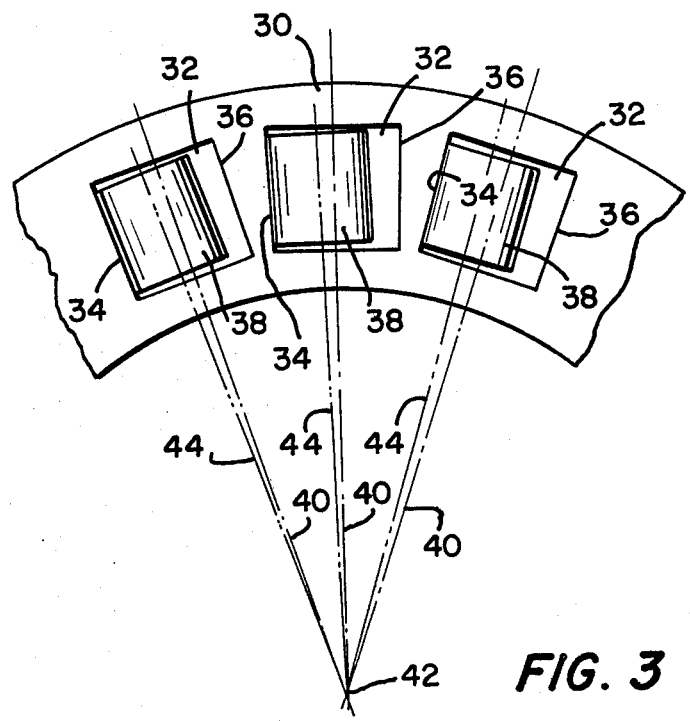
FIG. 3 is a schematic representation of a first preferred embodiment of our new cage and roller assembly.

One preferred embodiment of our new cage and roller assembly is schematically shown in FIG. 3. The annular cage 30 is provided with a plurality of circumferentially spaced trapezoidal pockets 32. The two walls 34 and 36 of the trapezoidal pockets converge radially inwardly. A cylindrical roller 38 is located in each of the trapezoidal pockets 32.

In order to function satisfactorily in both directions of rotation of the races (not shown) it is desirable to have the extended center lines 40 of the pockets 32 pass through the axis 42 with each pocket symmetrical about its center line. The trapezoidal shaped pocket provides such a structure. This trapezoidal shaped pocket, properly dimensioned and located, allows a full-line contact between the roller and either cage wall, at the same time that the roller axis is allowed the much desired radial orientation in the bearing. As indicated in FIG. 3, when one race (not shown) is rotated in a counterclockwise direction relative to the other race, looking at FIG. 3, the rollers 38 are moved into full-line contact with the walls 34 of the trapezoidal pockets. Of course, if the race (not shown) is rotated in a clockwise relative direction looking at FIG. 3, the rollers would move into full-line contact with the walls 36 of the trapezoidal pockets 32. The full-line contact of the rollers with the side of the pockets so that the extended center lines 44 of the rollers pass through the axis 42 prevent the wear at the corners of the pockets and insures smoother operation of the bearing.

Full-line contact between roller and pocket wall is not required in all cases so long as the roller is properly guided while in true radial orientation in the bearing.

A second preferred embodiment of our new cage and roller assembly is shown schematically in FIG. 4. The annular cage 50 is provided with a plurality of circumferentially spaced rectangular pockets 52 having lateral walls 54 and 56. A cylindrical roller 58 is located in each pocket 52. The extended center lines 60 of the pockets 52 do not pass through the axis 62 of the annular cage 50. However, when rollers 58 are in full-line contact with lateral wall 54, the extended center lines 64 of rollers 58 pass through the axis 62.

The shape of the end walls of the pockets and the shape of the roller ends are not critical to this invention. There must be enough clearance over the length of the rollers so the rollers can move freely into contact with the guiding lateral wall. In the case of the trapezoidal pocket, the roller must be free to move from full-line contact with one lateral wall into full-line contact with the other lateral wall. The end walls of the pockets may be straight or curved or may consist of multiple flats or arcs. One preferred design is a pocket with the radially outer end wall in the shape of a circular arc having the same radius as its distance from the center of the cage, so the roller may rub smoothly along the wall.

The term "cage" is intended to include all thrust bearing roller cages, retainers, and separators.

The term "thrust bearing" is intended to include all flat thrust bearings and all conical thrust bearings utilizing cylindrical rollers.

The terms "pocket lateral wall" and "pocket side wall" are intended to include any shape wall which, when contacted by a truly radially-oriented roller, will properly guide the roller in its radial alignment. Full-length contact between roller and wall is not required. The cage bars which form the pocket walls need not be flat, but may be stepped or bent or twisted and may have projections or depressions.

The cylindrical rollers may be fully cylindrical throughout their length or they may have relieved or depressed portions on their cylindrical peripheries.

We claim:

1. An annular roller thrust bearing cage and roller assembly for use in a thrust bearing comprising: an annular cage having a plurality of circumferentially spaced roller pockets, and a cylindrical roller located in at least one of the pockets; the shape and dimensions and location of each pocket and the shape and dimensions of each roller being such that running clearance exists between the roller and the lateral walls of the pocket and each roller pocket having at least one pocket lateral wall constructed and located so that as the thrust bearing begins to rotate in a predetermined direction the cylindrical roller contacts said at least one pocket lateral wall, in guided radial alignment and the extended center line of the cylindrical roller always passes through the axis of the annular cage as the thrust bearing continues to rotate in such predetermined direction.

2. An annular roller thrust bearing cage and roller assembly for use in a thrust bearing in accordance with claim 1 wherein the pockets are rectangular and the extended center line of each pocket does not pass through the axis of the annular cage.

3. An annular roller thrust bearing cage and roller assembly for use in a thrust bearing in accordance with claim 1 wherein each pocket is in the shape of a trapezoid with both lateral walls converging radially inwardly and when the roller abuts against either pocket lateral wall, the extended center line of the roller passes through the axis of the annular cage, and the roller is in guiding contact with the lateral wall the roller abuts against.

* * * * *